July 5, 1932.   J. P. T. NIELSEN   1,866,219
METHOD OF AND MACHINE FOR CAUSING FECUNDATION OF PLANTS
Filed May 29, 1930   5 Sheets-Sheet 4
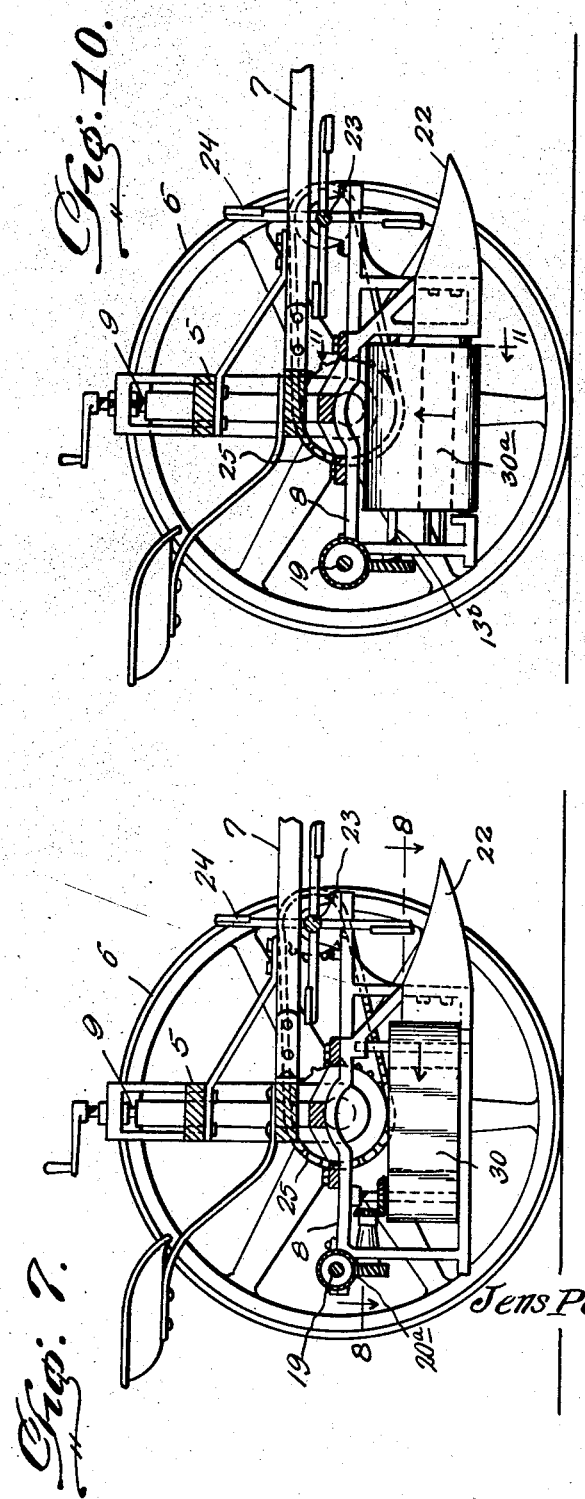
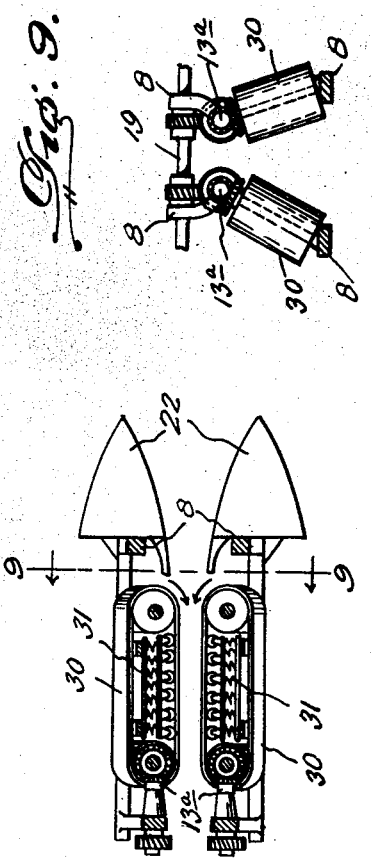
Jens Peter Theodor Nielsen,
INVENTOR.
BY J. Stanley Burch
ATTORNEY.

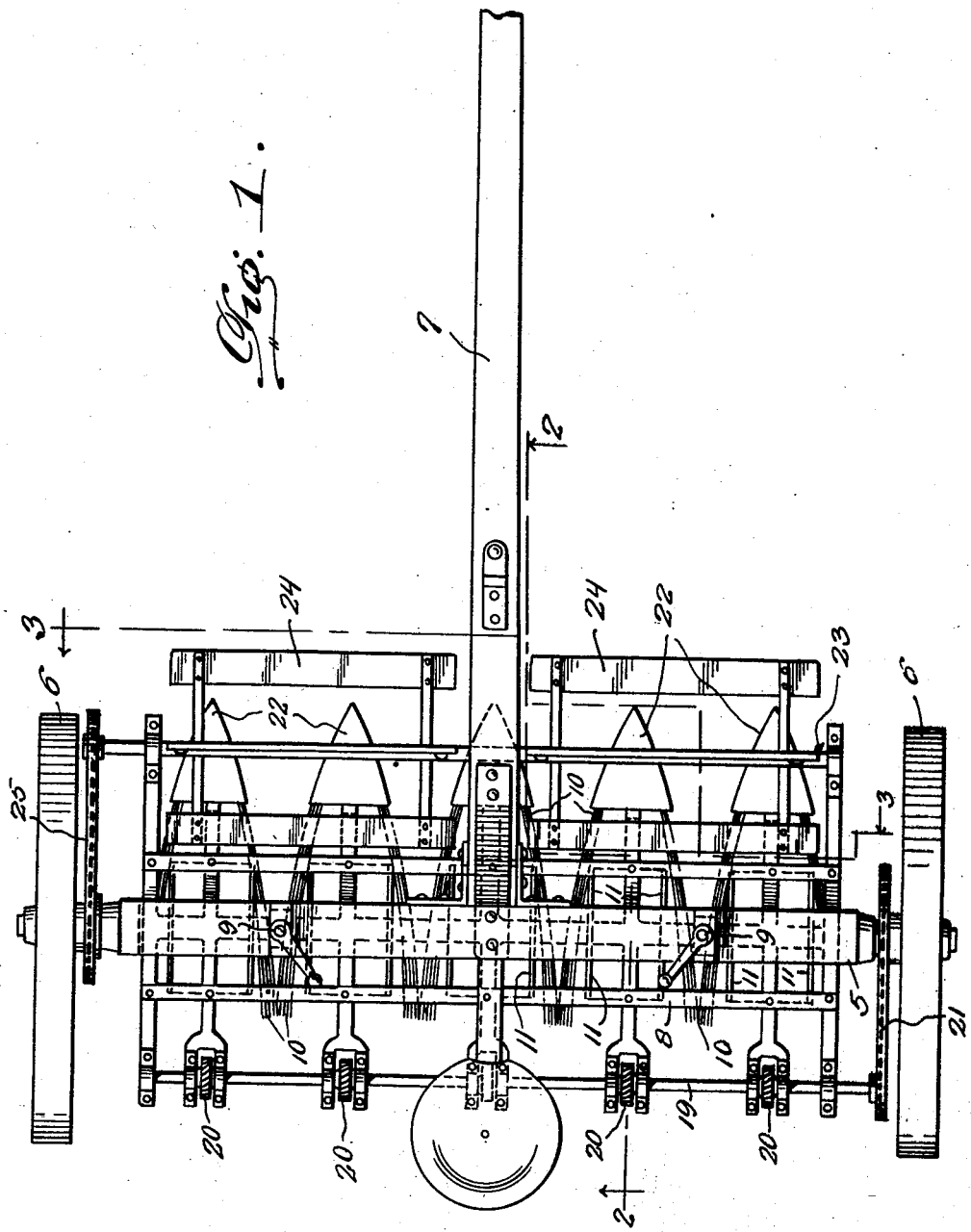

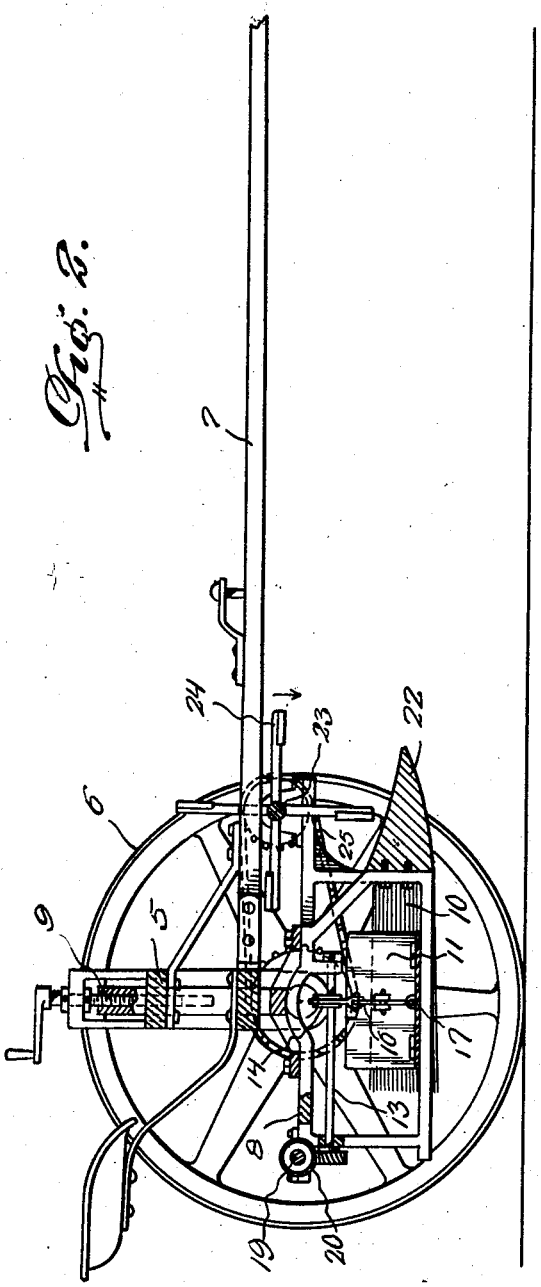
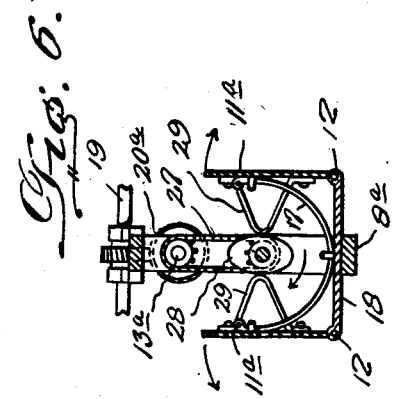
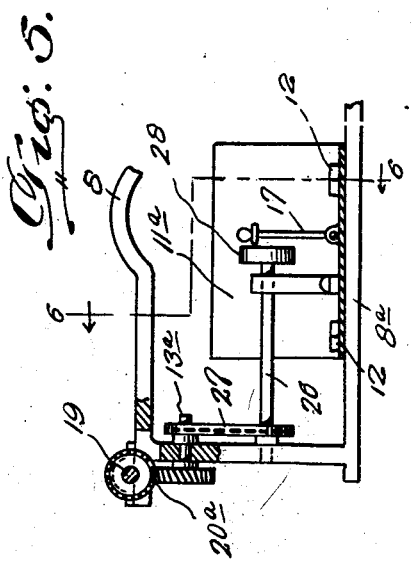

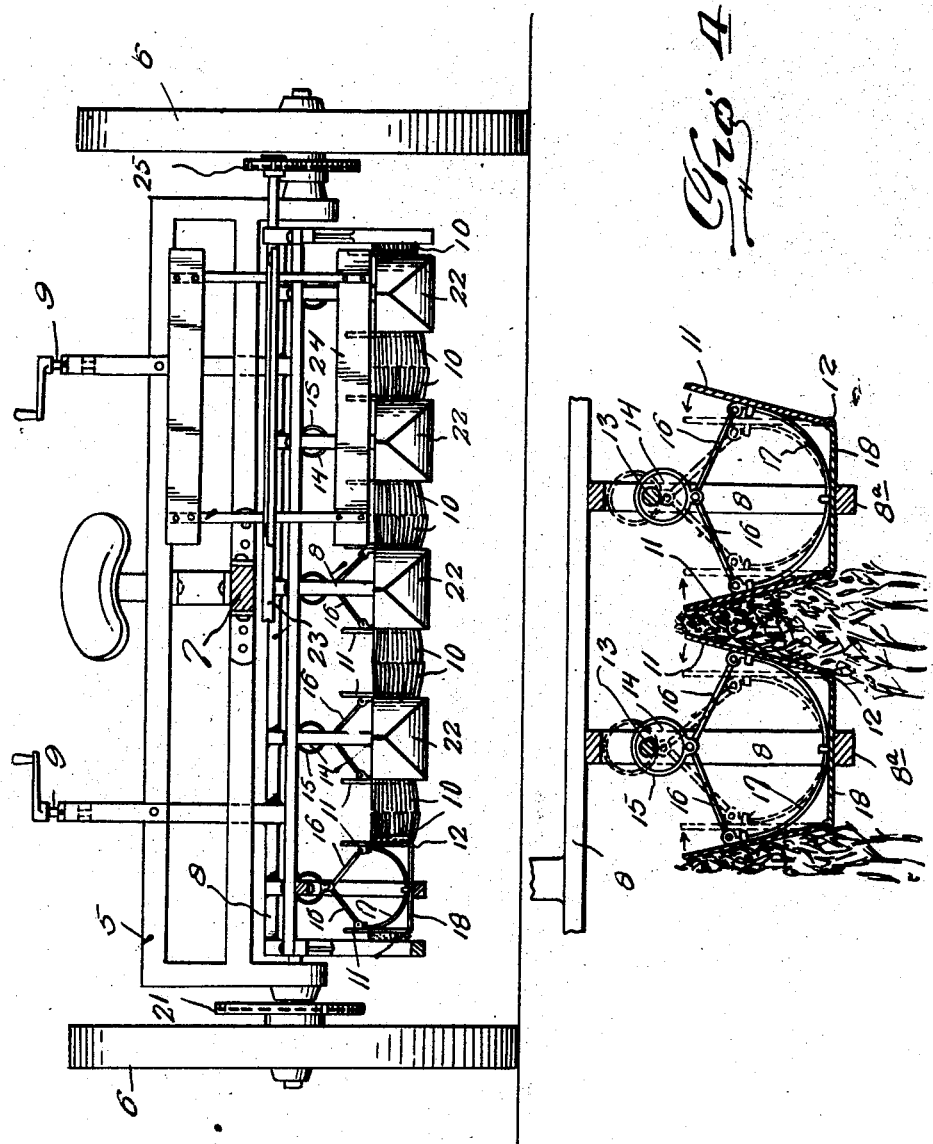

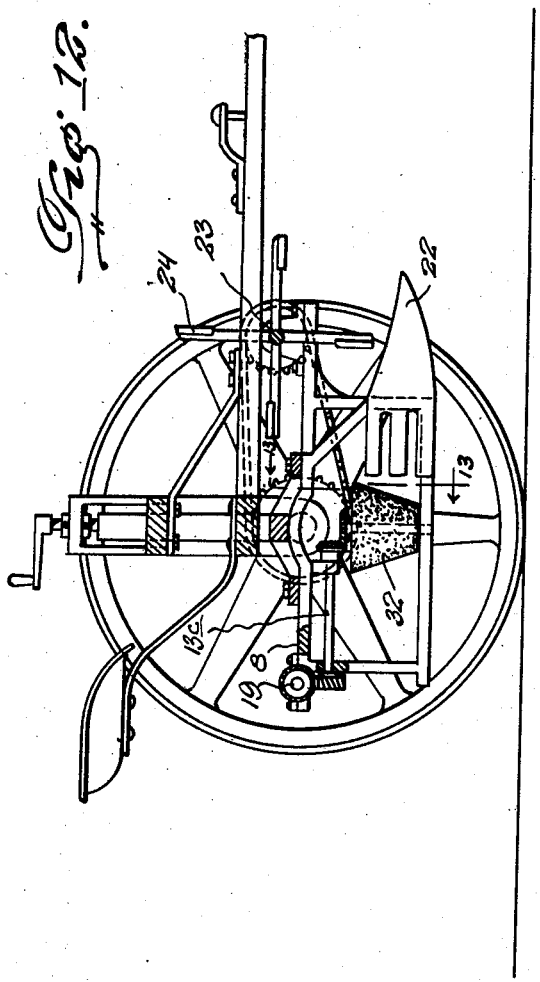
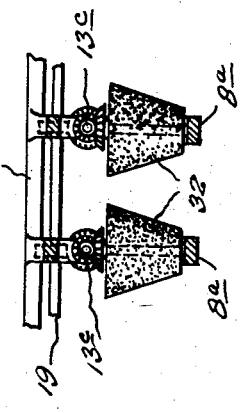
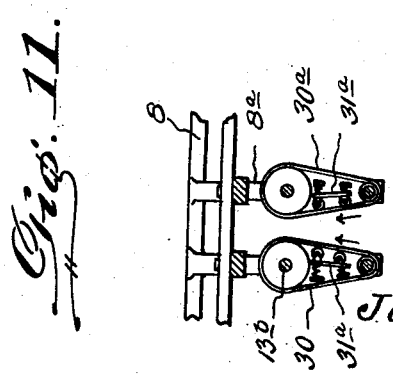

Patented July 5, 1932

1,866,219

UNITED STATES PATENT OFFICE

JENS PETER THEODOR NIELSEN, OF LAKE BENTON, MINNESOTA

METHOD OF AND MACHINE FOR CAUSING FECUNDATION OF PLANTS

Application filed May 29, 1930. Serial No. 457,257.

The present invention relates to a method of and a machine for causing fertilization of certain plants, particularly alfalfa.

It is the present practice to cause the fertilization of alfalfa plants by pressing and rubbing the blossoms by hand, thereby breaking the pods for releasing the stamens and causing distribution of the pollen. Such manual fertilization is very laborious, time-consuming, and devoid of uniform results unless carried out with patience and care. The primary object of this invention, therefore, is to provide a method of and a machine for expeditiously, uniformly and positively performing by mechanical means that which has, as stated above, heretofore been done manually.

Other objects and advantages of my invention will become apparent as the nature of the latter is better understood, and the invention consists in the novel method and machine construction hereinafter more fully described, shown in the accompanying drawings, and claimed.

In the drawings:

Figure 1 is a top plan view of a fecundating machine embodying the present invention.

Figure 2 is a vertical longitudinal section on line 2—2 of Figure 1.

Figure 3 is a vertical transverse section on line 3—3 of Figure 1.

Figure 4 is an enlarged fragmentary vertical transverse section through the pressing mechanisms of an adjacent pair of the devices, for rubbing and pressing the blossoms of plants, as shown in Figure 1.

Figure 5 is an enlarged vertical longitudinal section of a modified form of pressing mechanism.

Figure 6 is a transverse section on line 6—6 of Figure 5.

Figure 7 is a view similar to Figure 2 of a fecundating machine having a further modified form of rubbing and pressing devices.

Figure 8 is a fragmentary horizontal section on line 8—8 of Figure 7.

Figure 9 is a transverse section on line 9—9 of Figure 8.

Figure 10 is a view similar to Figure 7 of a machine having a still further modified form of rubbing and pressing devices.

Figure 11 is a fragmentary transverse section on line 11—11 of Figure 10.

Figure 12 is a view similar to Figure 10 of a machine having still another modified form of rubbing and pressing devices; and Figure 13 is a fragmentary transverse section on line 13—13 of Figure 12.

Referring more in detail to the drawings, the form of the invention illustrated in Figures 1 to 4 inclusive includes a main frame 5 having co-axial supporting wheels 6, and provided with a tongue 7, or shafts, to provide means whereby a horse may be hitched to the machine for the purpose of pulling it over the ground. Suspended from the main frame 5 between the supporting wheels 6 is a sub-frame 8, and carried by the main frame 5 and operatively connected to the sub-frame 8 are adjusting screws 9 by means of which the sub-frame 8 may be vertically adjusted, for a purpose which will presently become apparent.

Carried by the sub-frame 8 are a plurality of spaced mechanical devices for rubbing and applying pressure to opposite sides of the blossoms of plants. In this form of the invention, each of said devices includes a pair of rearwardly converging rubbing elements 10 and a pair of spaced pressing elements 11 rearwardly between which the rubbing elements 10 project. As shown, each rubbing element consists of a bunch of fibres or bristles attached to the sub-frame 8 forwardly of the pressing elements 11, and freely flexible laterally at their rear end portions. The pressing elements 11 consist of sheet metal plates hinged at their lower ends as indicated at 12 to swing laterally on a horizontal axis, whereby the pressing elements of each pair are movable toward and from each other against opposite sides of the plants passing therebetween as clearly illustrated in Figure 4, and it will be noted that when the pressing elements 11 are swung toward each other they assume a downwardly diverging relation so as to provide clearance for the lower portions of the plants where the foliage is thicker. Extending longitudinally between the pressing elements 11 of each adjacent pair is a horizontal shaft 13 carrying an eccentric 14 which has an eccentric strap or ring 15 operatively associated therewith. The eccentric ring 15 is operatively connected to the pressing elements or plates 11 of adjacent pairs by means of connecting rods 16, and it will thus be seen that when the shafts 13 are rotated, the pressing elements 11 of each pair are alternately swung toward and away from each other to intermittingly apply pressure upon opposite sides of the blossoms of the plants passing between the paths of pressing elements, as the machine is drawn ahead. Springs 17 may be interposed between the adjacent pressing elements of adjacent pairs to assist in swinging them apart or in the direction wherein the pressing operation is affected. It will be noted that the sub-frame 8 has spaced depending portions 8a upon which are mounted supporting plates 18 to which the pressing elements 11 of adjacent pairs are pivotally connected at 12 as mentioned above. In order to simultaneously drive all of the shafts 13 for actuation of the several pressing elements, the sub-frame 8 has a transverse counter-shaft 19 journalled at the rear thereof, said shaft 19 being geared at 20 to the rear ends of the shafts 13, and operatively connected at one end by sprocket gearing 21 or the like with the hub of the adjacent supporting wheel 6. Obviously, by operating the adjusting screws 9, the sub-frame 8 may be vertically adjusted to regulate the height of the rubbing and pressing devices above the surface of the ground, in accordance with the size of the plants being treated.

Carried at the front lower portion of each depending portion 8a of the sub-frame 8 is a guide or deflector finger 22, similar to the guard fingers of mowers, binders and harvesters. In other words, the fingers 22 are of pointed or tapered form and, being arranged between adjacent pairs of rubbing and pressing devices, deflect the plants between said pairs of devices for being properly operated upon thereby. Journaled in the forward part of the sub-frame 8 above the deflector fingers 22 and forwardly of the rubbing and pressing devices is a shaft 23 carrying transverse rotating reels 24 somewhat similar to those found on binders and harvesters. The shaft 23 is operatively connected at one end by means of a sprocket gearing 25 or the like with the hub of the other supporting wheel 6 thus providing for positively rotating the reels 24 in the direction of the arrow shown in Figure 2, upon forward travel of the machine. It is thus apparent that the reels provide means for forcing the upper portions of the plants rearwardly and downwardly between the rubbing and pressing devices for more positive action thereon and so that rubbing and pressing of the blossoms of the plants will be insured even though the vertical dimensions of said devices does not correspond with the height of the portions of the plants carrying the blossoms.

From the above description, it is believed that the general purpose and operation of the invention will be understood. However, it is noted that upon forward travel of the machine the pressing elements 11 will be rapidly swung back and forth, in a lateral direction so as to cause the pressing elements of each pair to move toward and away from each other. As the plants are forced rearwardly by the reel 24, they are guided between the rubbing and pressing devices by the fingers 22, whereupon the rubbing devices or bristles 10 provide for a rubbing action on the opposite sides of the blossoms of the plants while the pressing elements 11 exert a slight pressure thereon from opposite sides and intermittently. In this way the pods of the blossoms are broken to release the stamens and cause distribution of the pollen. The machine illustrated is particularly designed for use where the alfalfa is planted in straight rows. However, in case the plants are derived from seeds sown broadcast, all of the plants may be effectively treated by simply providing a second row of rubbing and pressing devices behind the row shown with the devices of one row staggered or alternated with respect to those of the other row, as well as arranged at a slightly different elevation. This involves little more than duplication of the construction and mechanism illustrated, as regards the sub-frame and parts carried thereby.

Referring to Figures 5 and 6, a different means for actuating the pressing elements 11a will be apparent. In this figure, the shafts 13a are in the nature of sub-shafts operatively geared as at 20a with the transverse shaft 19, a longitudinal shaft 26 being provided between adjacent presser plates 11a, and below the shaft 13a, as well as operatively geared to the latter by means of a sprocket gearing 27. The forward end of the shaft 26 carries a double lobe cam 28 arranged to bear upon opposed abutments 29 rigid with and projecting laterally from opposite sides of the adjacent elements 11a as shown in Figure 6. This provides a more direct actuation of the elements 11a through the rigid abutments 29, as compared to the eccentric 14, eccentric ring 15 and connecting rods 16. Otherwise, the construction of Figures 5 and 6 is substantially the same as that shown in Figures 1 to 4 inclusive.

In Figures 7 and 8, the rubbing and pressing devices consist in pairs of spaced horizontal driven belts 30 operatively geared to the sub-shaft 13a and arranged in pairs disposed in downwardly diverging relation as shown in Figure 9. The belts 30 are driven so that those of adjacent pairs travel rearwardly in harmony with the direction of travel of the machine, suitable means being provided as at 31 for yieldably pressing the inner strands of adjacent belts 30 toward each other so that slight pressure is applied upon opposite sides of the blossoms of the plants passing therebetween. This pressure, combined with the rearward travel of the adjacent belts 30 provides for the necessary rubbing and pressing action substantially equivalent to that provided by the elements 10 and 11 in Figures 1 to 4 inclusive. Except for the substitution of the belts 30 and the yieldable means 31 for the elements 10 and 11, the construction of Figures 7 to 9 inclusive is substantially the same as shown in Figures 1 to 4 inclusive.

The construction illustrated in Figures 10 and 11 corresponds with that of Figures 7 to 9 inclusive except that the belts 30a travel in a vertical direction as indicated by the arrow in these figures. To accomplish this, the upper roller for each belt is carried by a shaft 13b substituted for the shaft 13a and operatively geared to the shaft 19. The belts 30a also have yieldable means 31a for pressing the inner strands thereof to each other as regards the belts of adjacent pairs, as shown clearly in Figure 11.

The form of invention illustrated in Figures 12 and 13 provides for the arrangement of pairs of vertical conical rubbing elements 32 in place of the rubbing and pressing elements 10 and 11. The conical elements 32 may be in the nature of rotary fibrous brushes driven by a shaft 13c geared to the shaft 19 and arranged with their smaller ends lowermost to provide for the downwardly increasing space between the elements as shown in Figure 13. However, the devices 32 may consist of hollow cones having internal springs, or of yieldable resilient material such as sponged rubber or the like. In any event, they will be of a resilient or yieldable nature so as to apply general pressure to opposite sides of the blossoms of the plants standing therebetween, at the same time exerting a rubbing action on the blossoms by reason of the rotation of said elements 32. Otherwise, the construction of Figures 12 and 13 is substantially the same as that shown in Figures 1 to 4 inclusive, and the general function and operation is likewise similar.

Several different embodiments of the invention have been illustrated to clearly show that the general invention may be carried out in many different ways. The construction or type of machine employed will depend greatly upon the surrounding circumstances such as the density of growth encountered, the favorable or unfavorable condition of the blossoms being operated upon, and the funds available for providing the equipment. Obviously, one form of the invention may not be quite so economical to manufacture as another, but in any case a reasonable operation is insured.

I desire it to be understood that I am not to be limited to the details of construction herein shown and described, nor to the particular means for rubbing and pressing the blossoms, the same being capable of various changes in construction and capable of operation in various ways.

What I claim as new is:

1. A fecundating machine comprising spaced mechanical devices to rub and press the blossoms of plants therebetween, said devices embodying mechanically actuated moving pressing elements and yieldable rubbing elements.

2. A fecundating machine comprising spaced mechanical devices to rub and press the blossoms of plants therebetween, and means for forcing the upper portions of the plants between said devices.

3. A fecundating machine comprising spaced mechanically actuated devices to rub and press the blossoms of plants therebetween, said devices providing a space therebetween which increases downwardly to conform to the thickness of the foliage of the plants.

4. A machine for the fecundation of plants, including a wheeled frame, movable blossom pressing and rubbing elements carried by said frame, and mechanical means for driving said elements.

5. A machine for the fecundation of plants, including a wheeled frame, movable blossom pressing and rubbing elements carried by said frame, and mechanical means for driving said elements, said elements being arranged in pairs disposed side by side, and means for diverting the plants between the elements of each pair.

6. A machine for the fecundation of plants, including a wheeled frame, movable blossom pressing and rubbing elements carried by said frame, means for driving said elements, said elements being arranged in pairs disposed side by side, means for diverting the plants between the elements of each pair, and means for forcing the upper portions of said plants rearwardly and downwardly between said elements.

7. A machine for the fecundation of plants, including a wheeled frame, movable blossom pressing and rubbing elements carried by said frame, mechanical means for driving said elements, said elements being arranged in pairs disposed side by side, means for diverting the plants between the elements of each pair, and means for simultaneously vertically adjusting said elements.

8. A fecundating machine comprising spaced devices to rub and press the blossoms of plants therebetween, said devices embodying movable pressing elements, and mechanical means to move said pressing elements.

9. A fecundating machine comprising spaced movable elements to rub and press the blossoms of plants therebetween, mechanical means to actuate said movable elements, and means to vertically adjust said elements.

In testimony whereof I affix my signature.

JENS PETER THEODOR NIELSEN.